April 30, 1963 L. J. WUBBE 3,087,343
WINDSHIELD WIPER ASSEMBLY
Filed Oct. 22, 1959 3 Sheets-Sheet 1

INVENTOR.
LEO J. WUBBE
BY W. E. Recktenwald
C. S. Penfold
ATTORNEY

April 30, 1963 L. J. WUBBE 3,087,343
WINDSHIELD WIPER ASSEMBLY
Filed Oct. 22, 1959 3 Sheets-Sheet 2

INVENTOR.
LEO J. WUBBE
BY W. E. Recktenwald
C. S. Penfold
ATTORNEY

United States Patent Office 3,087,343
Patented Apr. 30, 1963

3,087,343
WINDSHIELD WIPER ASSEMBLY
Leo J. Wubbe, Beverly Shores, Ind., assignor to The Anderson Company, a corporation of Indiana
Filed Oct. 22, 1959, Ser. No. 851,210
4 Claims. (Cl. 74—95)

This invention relates to a windshield wiper assembly and more particularly to an improved drive connection between the wiper motor and the wiper arm-and-blade subassembly.

In automobiles on the highway today, two major drive connection systems are being used. One system is called the bar linkage system and the other system is called the cable drive system. In the bar linkage system, bell cranks and links are used to transmit the motion of the power unit to the oscillatory motion of the arm-and-blade subassemblies. In the cable drive system, cables extend from the power source to the output shafts to transmit the motion of the power source to the arm-and-blade subassemblies. These systems are repleat with disadvantages, both from the installation point of view as well as from the maintenance and operation point of view.

In the bar linkage or bell crank system, cranks are provided both on the pivot shafts for the arm-and-blade subassemblies as well as on the drive motor or power unit. The cranks on the pivot shafts are connected with the cranks on the drive motor whereby the subassemblies are oscillated. Manufacturing variations in the dimensions between the locations of the pivot shafts, between bearing locations on the respective links, motor output shaft location relative to the pivot shafts, and various other deviations from locations which inherently must be substantially perfect cumulatively cause the resulting system to be either totally inoperative or at best substantially ineffective. In addition, once the system is installed, changes in temperature cause changes in the relative positions of the pivot shafts and bearing centers such that a system that operates at normal average temperatures becomes troublesome at minus 20 degrees F. or plus 120 degrees F. The system is limited in the size of the stroke able to be wiped by the subassembly, which especially creates a problem on the newer wrap-around or panoramic windshields. Due to the metal-to-metal contact between parts of the linkage, the system becomes loose and noisy with age, which in addition to being annoying can also be dangerous as it is susceptible to failure.

In the cable drive system, pulleys are provided on the motor shaft and pivot shafts which are interconnected by long stretches of cables for transmitting the motion of the motor to the motion of the arm-and-blade subassemblies. The chief disadvantages of this system relate to stretch in the cables which permit slack to develop. Slack in the cables causes the system to vary the movement of the subassemblies so as to change undesirably the wipe pattern on the windshield. The slack also causes excessive slap of the blades against the windshield frame as well as causing excessive layover of the blades relative to the windshield whereby the windshield can be scratched. Maintenance costs on the cable system are high and although expensive slack take-up devices have been proposed and used, they are only effective for a small amount of slack take-up after which time further slack still causes the undesirable slap and layover.

A highly desirable improved system has been proposed wherein a link member extends from the power source to a position adjacent a pulley on the pivot shaft of an arm-and-blade subassembly. The link member and pulley are operatively connected by a short stretch of cable which is wrapped around the pulley and fastened at its ends to spaced points on the link member. Reciproca-tion of the link member causes the cable and pulley to oscillate the arm-and-blade subassembly. All of the disadvantages of the prior bar linkage system and cable drive system are obviated by this last-named system.

My invention is an improvement on this last-named system and comprises an improved wiper drive assembly positioned between the pivot shafts and wipers motor such that the output drive of the wiper motor is converted to the oscillatory motion of the pivot shafts and arm-and-blade subassemblies.

It is, therefore, an object of my invention to provide an improved wiper drive assembly that substantially overcomes all of the disadvantages of the prior art.

It is another object of my invention to provide a wiper drive assembly wherein the spacing between the pivot shafts and the motor shaft, the length of link members and the changes in temperature surrounding the assembly have no noticeable affect on the installation or operation of the system.

It is still another object of my invention to provide an improved wiper drive system wherein slack take-up devices are substantially eliminated.

It is a further object of my invention to provide an improved wiper drive assembly wherein misalignment between the drive link and the pivot shafts does not affect the efficient output of the system.

A still further object of my invention is to provide an improved wiper drive assembly having substantially uniform thrust to the drive shaft.

A further object of my invention is to provide an improved wiper drive assembly having highly efficient means for converting the motor drive to reciprocatory movement of the link member and to the oscillatory movement of the arm-and-blade subassembly.

Another object of my invention relates to simplified linkage arrangement for transmitting the motion from the power unit to the pulley-and-cable subassemblies.

Still another object of my invention relates to the improved guide-and-cable connection between the pulley and link member whereby improved motion conversion from the link to the pivot shaft is obtained.

Yet another object of my invention is to provide a novel wiper drive assembly for converting efficient, quiet and uniform output movement of a power unit into the oscillatory movement of the arm-and-blade subassembly.

A further object of my invention is to provide an assembly that is adaptable, durable, simple in design and construction, easy to install and maintain and highly practical in use.

Other objects and advantages of the invention will become apparent after the description hereinafter set forth is considered in conjunction with the drawings annexed hereto.

Figure 1:
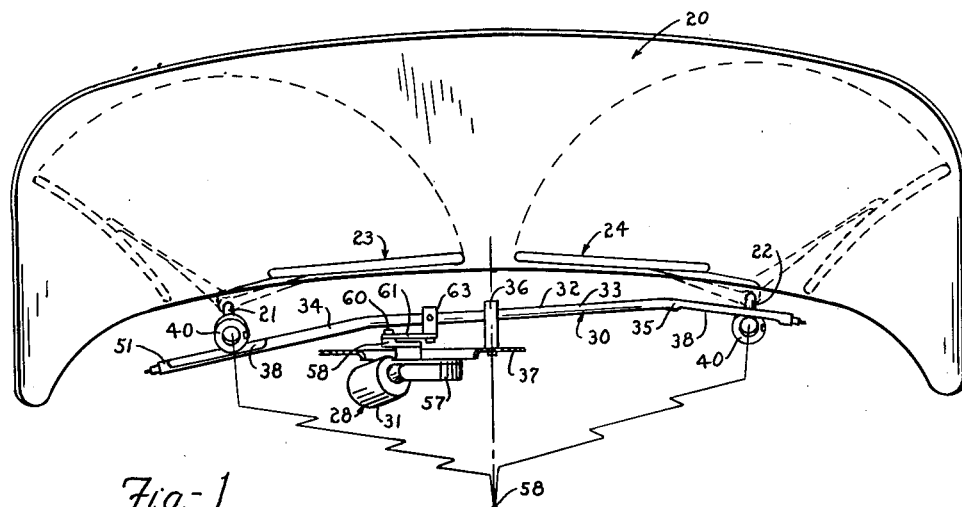
FIGURE 1 is an elevational view of the rear side of a windshield illustrating the apparatus embodying the invention as applied thereto.
Figure 2:
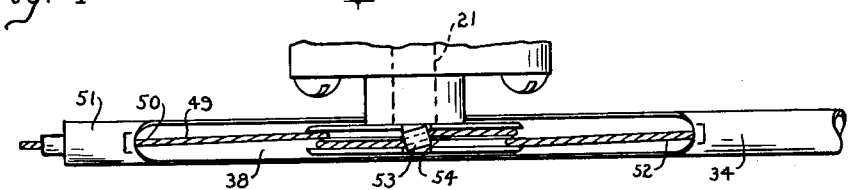
FIGURE 2 is a top view of one end of the apparatus of FIGURE 1 showing the connection between a link and a driven shaft for a wiper arm.

Referring to the drawings and more particularly to FIGURES 1–4, a windshield 20 is illustrated with a pair of pivot shafts 21, 22 mounted along the lower edge portion thereof for supporting a pair of windshield wiper arm-and-blade subassemblies 23, 24, respectively, for oscillatory movement across the surface of the windshield. A power unit 28 is operatively connected to the respective shafts 21, 22 through a motion-transmitting unit 30 whereby the rotary motion of the output of the motor 31 is converted to the oscillatory motion of the wiper arm-and-blade subassemblies.

The motion-transmitting unit 30 is comprised of an elongate link member 32 having predetermined angular bends or shaping at the ends of the intermediate portion 33 thereof so that the respective end portions 34, 35 are directed in a particular angular relationship with respect to the center portion of the link member 32. The intermediate portion 33 of the link member 32 passes through a bearing block 36 which is rigidly mounted on the fire wall or frame 37 of the motor vehicle so as to permit the link 32 of the unit 30 to slide freely therethrough. In the illustrated form, the link member is tubular in cross section and has a side wall of the end portions 34, 35 cut away to provide a substantially semicylindrical hollow elongate section 38 which is terminated short of the ends of the link. The left-hand end 34 of the link 32 of FIGURE 1 has the cutaway portion facing substantially upwardly and the right-hand end 35 has the cutaway portion facing substantially downwardly.

Figure 4:
FIGURE 4 is a cross-sectional view taken along the lines 4—4 of FIGURE 3.

A pulleylike member 40, which can be die-cast, stamped or the like, is keyed to the inner end portion of each shaft 21 and 22, which shafts are mounted in bearings extending through the cowl of the vehicle. Each pulleylike member 40 is adapted to oscillate with the appropriate shaft for driving the arm-and-blade subassemblies across the windshield. Each pulleylike member 40 has a groove 42 formed in the periphery thereof which groove has a raised lip 43 formed in its base wall for dividing the bottom of the groove 42 into two parts 45, 46. The exterior peripheral surface 48 of the pulleylike member 40 is semicircular in cross section, as best shown in FIGURE 4, so as to operatively nest within the cylindrical hollow portion 38 of either end portion 34, 35 of link 32.

A cable 49 or the like is adapted to be fastened at one end 50 to the outer end 51 of the portion 34 of the link 32 and is wrapped around the pulleylike member 40. The cable 49 is fastened in taut condition at its other end 52 to the link just beyond the cutaway section 38 of the link. As the cable 49 passes around the pulley 40, it is nested in the part 45 of the groove part of the way around the pulley and in part 46 of the groove the rest of the way around the pulley. A lug or stop 53 is clamped on the cable 49 substantially midway between the ends of the cable. Formed in the periphery of the pulleylike member is a notch 54 in which the lug or stop member 53 is seated so as to limit slippage of the cable 49 relative to the pulleylike member. The lug 53 is positioned on the pulley substantially midway between the ends of the cable and at the point where the cable changes over from part 45 of the groove to part 46 thereof.

Figure 3:
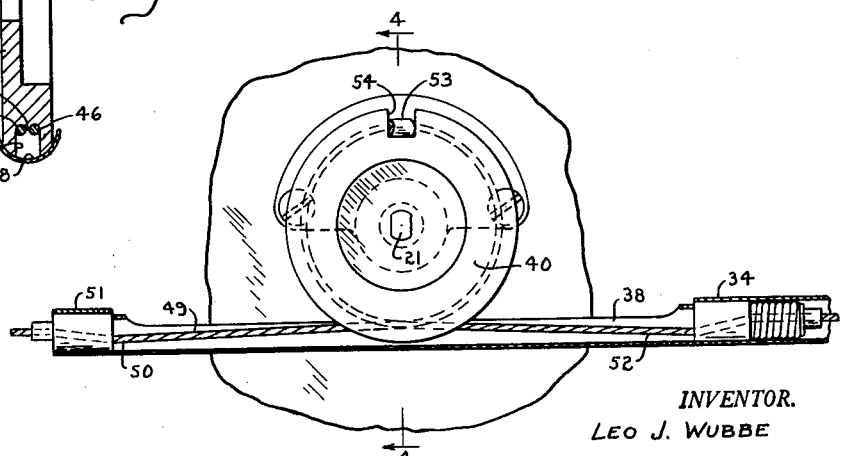
FIGURE 3 is an elevational view of the structure shown in FIGURE 2 showing the operative relationship of the components associated therewith.

The depth of the groove 42 from the parts 45, 46 at its base wall to the semicylindrical peripheral surface 48 is significant. As best shown in FIGURE 3, the ends 50 and 52 of the cable 49 are deflected downwardly so as to enter the cutaway section 38 of the end portion 34 near the bottom of said section 38. The cable 49 extends upwardly from the lower or bottom part of the section 38 to the pulley-like member 40 where it is seated in the parts 45, 46 of the base of the groove 42. The cable 49 is spring-loaded with a predetermined amount of tension so that the angular disposition of the cable from the ends 50, 52 to the groove in the pulleylike member 40 creates a force tending to urge the pulley 40 into nesting relation with the section 38 of the link 32. As a result of the nesting force, the surface 48 of the pulley 40 rolls against the inner surface of the section 38 of the link from one end of the section to the other no matter whether the link is below the pulley 40, above the pulley 40, or at any point therebetween.

The coacting guiding fit between the peripheral surface 48 of the pulley 40 and the inner cylindrical surface of the section 38 provides stability between the pulley 40 and the link 32. Under normal conditions, it is to be expected that the direction of motion of the link 32 at the contact between the pulley and link is to be tangential contact directed at right angles to the axis of the shaft. However, due to the flexibility of the system, the direction of motion from the link to the pulley can vary several degrees from the perpendicular relationship with respect to the shaft. In addition, the link 32 can roll several degrees about its longitudinal axis relative to the pulley, or the angle of contact of pulley with respect to the link 32 (see FIGURE 4) can vary several degrees without affecting or interfering with the operation of the device.

The power unit 28 may be any one of the currently existing types but for purposes of illustration is shown as comprising the continuously driven electric motor 31 operatively connected with a mechanical unit 57 of well-known type which is adapted to modify the rotary motion of the motor and to provide means for positioning the motion-transmitting unit 30 and the arm-and-blade subassemblies 23, 24 in a parked position.

A rotatably driven crank 58 is pivotally connected by pin 60 to the drive link 61 which is pivotally connected with the member 63 fastened to the intermediate portion 33 of the link 32. Since link 32 is constrained to move in a substantially reciprocatory manner, the crank 58 and drive link 61 serve to convert the rotary motion of the motor 31 to the reciprocatory motion of the link 32 of the motion-transmitting unit 30. The reciprocating motion of the link 32 is applied to the respective pulleylike members 40 and shafts 21, 22 for driving the wiper arm-and-blade subassemblies.

The link 32 has the end portion 34 operatively connected with the pulley 40 through the cable 49 at the lower portion of the pulley with the end portion 35 of the link 32 operatively connected with the other pulley 40 through cable 49 at the upper portion of the pulley. With the link 32 so connected to the pulleys 40 on the shafts 21, 22, reciprocation of the link 32 moves the arm-and-blade subassemblies 23, 24 from a position with both blades at the center of the windshield to a position with both blades at the outboard side of the windshield.

Due to the design of modern windshields, it is necessary to position the pivot shafts 21, 22 so as to be directed inwardly, downwardly and rearwardly of the windshield in such a way that the centerlines 55, 56 of the shafts 21, 22 when extended intersect at a theoretical point 58 which is located a substantially equal distance from the inner ends of the shafts 21, 22. The point 58 also lies on a centerline passing through the bearing 36 in such a way that the distance from the end of either shaft 21, 22 to the point 58 is equal to the distance from the point 58 to the center of the bearing 36 where the link 32 passes therethrough. With the link 32 operatively connected to the pulley 40 on shaft 21 at the lower side thereof and to the pulley 40 on the shaft 22 at the upper side thereof, the distances, from the point of contact of each pulley 40 with the link 32 to the theoretical point 58 is still substantially equal to the distance from the bearing 36 to the point 58. Accordingly, the points of contact between the pulleys and the bearing 36 with the end portions 34, 35 and the intermediate portion 33 of the link all lie in a substantially common arc having its center substantially at point 58. With the power unit 28 delivering substantially reciprocating motion to the intermediate portion 33 of the link 32, the link—due to the nesting contact with the pulleys 40—is reciprocated in a substantially arcuate path along the axis of the arc subscribed about the theoretical point 58.

Due to the flexibility of the connection between the link 32 and the pulleys 40, and due to the nesting force between the pulley and the link 32, the reciprocatory motion of the link 32 is able to be converted to the oscillatory motion of the pulley and shaft even though the axis of the shaft is out of normal alignment and/or is not at right angles to the direction of movement of the end portion 34 or 35 of the link 32. The flexible connection permits the shaft 21 (or 22) and pulley 40 to be several degrees out of alignment in any given direction without in any way interfering with the efficient drive from the power unit 28 to the arm-and-blade subassemblies.

The motion-transmitting unit 30 permits wide variations, both in manufacture and during use, in the relative positions of the pivot shafts 21 and 22 with respect to each other. The relative angles of the shafts can vary relative to each other, the distances between the shafts can vary in manufacture, and the distances between the shafts can change due to changes in temperature in the surrounding air without in any way complicating installation of the motion-transmitting unit 30 or in any way effecting its efficiency once it has been installed.

Figure 5:
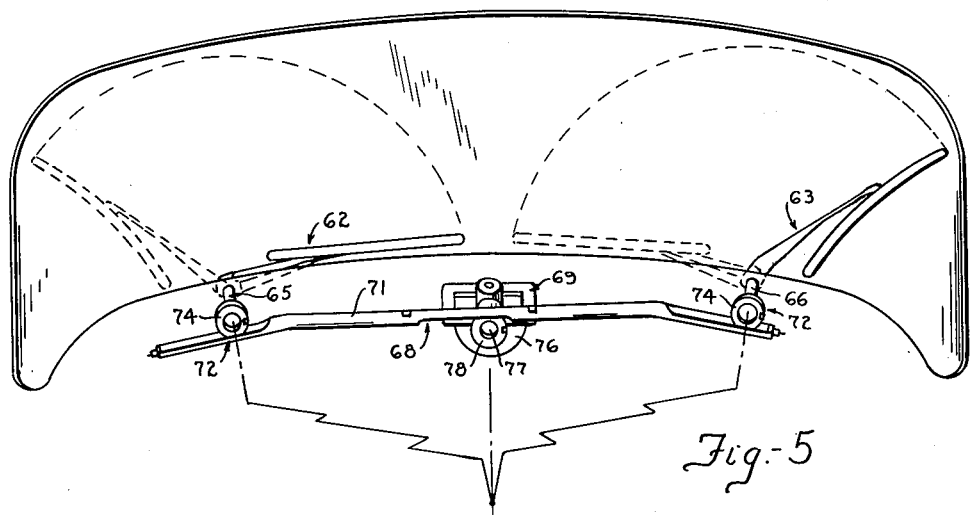
FIGURE 5 is a view similar to FIGURE 1 showing a modified form of the apparatus connected for a different sequence of operation of the wiper arms.
Figure 6:
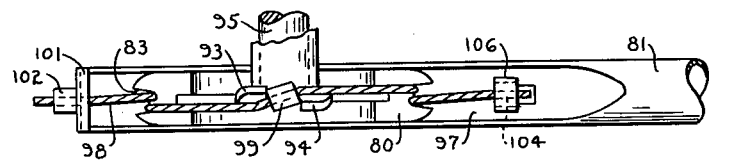
FIGURE 6 is a top view of one end of the apparatus of FIGURE 5 showing the connection between the link and the driven shaft of a wiper arm.
Figure 8:
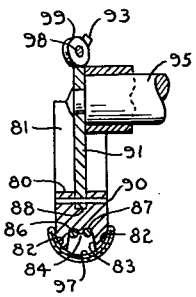
FIGURE 8 is a cross-sectional view taken along the lines 8—8 of FIGURE 7.
Figure 7:
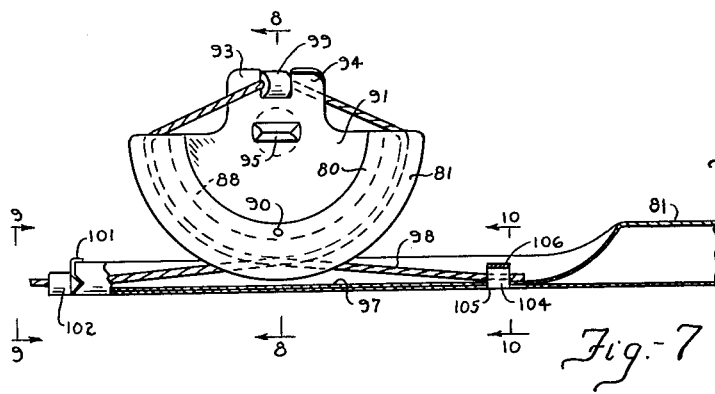
FIGURE 7 is an elevational view of the structure shown in FIGURE 6 showing the operative relationship of the components associated therewith.
Figure 9:
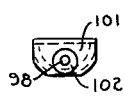
FIGURE 9 is an end view taken along the lines 9—9 of FIGURE 7.
Figure 10:
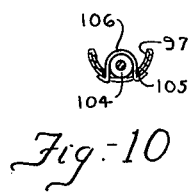
FIGURE 10 is a cross-sectional view taken along the lines 10—10 of FIGURE 7.

FIGURE 5 shows a further modification of my invention wherein the arm-and-blade subassemblies 62, 63 are connected to the pivot shafts 65, 66, to the motion-transmitting unit 68, and to the power unit 69 for a "tandem" wipe. That is, where the arm-and-blade subassemblies move to the right together and to the left together.

The motion-transmitting unit 68 comprises a link member 71 and a pair of flexible cable and pulley connections 72 of the general type shown and described with respect to FIGURES 1-4. To drive the arm-and-blade subassemblies 62, 63 in the same direction, it is necessary to have the link 71 connected on the pulleys 74 at the same side of the pulleys which, as shown in FIGURE 5, can be the bottom part of the pulleys and the upper part of the link members. As the link member 71 is reciprocated, the cables oscillate the pulleys 74, shafts 65, 66 and arm-and-blade subassemblies 62, 63.

The power unit 69 is illustrated as an oscillating type of vacuum motor 76 which is adapted to oscillate an output shaft 77. A pulley 78 is fastened to the shaft 77 and is adapted to be oscillatably driven by said vacuum motor. A cable is wrapped around the pulley 78 with the ends of the cable fastened to the link member in a manner similar to the flexible connection described with respect to the pulleys 40 of FIGURES 1-4. As the wiper motor 76 is oscillated, the pulley 78 and cable attached to the intermediate portion of the link 71 reciprocates the link 71 and drives the pulleys 74, shafts 65, 66 and arm-and-blade subassemblies 62, 63 in an oscillatory manner. The three points of contact between the pulleys 74, pulley 78, and the link 73 lie substantially in a common arcuate path such that the reciprocatory motion of the link 71 is substantially along its longitudinal axis. Variations in alignment of the axes of the shafts as well as manufacturing and temperature variations do not interfere with the assembly or operation of the system.

FIGURES 6-10 show a modified form of pulley 80 and connection with a link member 81. The pulley 80 is shown as comprising a cast semicircular ring member 81 having a semicircular cross-sectionally shaped peripheral surface 82. A groove 83 is formed in the periphery and has a rib 84 in the base thereof dividing it into two parts 86, 87. A slot 88 is formed in the inner face of the ring in which is keyed by pin 90 a flat disc member 91. A pair of tabs 93, 94 are upset in opposite directions from the one end of the disc 91 with a slot formed therebetween. An opening is formed in the center of the disc 91 in which is secured one end of a pivot shaft 95 for actuating an arm-and-blade subassembly.

The link member 81 is tubular in cross section and has an end portion rolled into a cylinder elongate section 97. A cable member 98 having a lug 99 clamped near its midpoint has one end fastened near the bottom of one end of the link 81 and has its other end fastened near the bottom of the other end of the section 97. The cable is wrapped around the pulley 80 in the parts 86, 87 of the groove 83 with the lug 99 seated between the tabs 93, 94 to prevent slipping between tht cable and the pulley. A shaped cap 101 is adapted to be secured over the end of the section 97 with a hole therein near the bottom of the section 97 for permitting the cable 98 to pass therethrough. A lug 102 is clamped to the end of the cable against the cap 101 to secure one end of the cable in place on the link 81. The other end of the cable has a lug 104 clamped thereto which is adapted to nest through an opening 105 in the base or bottom of the section 97. The lug 104 is held in position by the U-clamp 106 embracing the lug 104 and seating in the opening 105. In assembly, the lug 102 is clamped to the cable last after the cable is pulled to the desired tautness through the opening in the cap 101. Due to the tautness of the cable and due to the distance between the base of the groove 83 in the pulley 80 and the base or bottom of the section 97 of the link 81 a force is created tending to nest the pulley 80 in the section 97 of the link.

The surface 82 of the pulley 80 is adapted to roll in the section 97 as the pulley and link are moved relative to each other to transmit reciprocating motion of the link to oscillatory motion of the pulley or vice versa.

Figure 11:
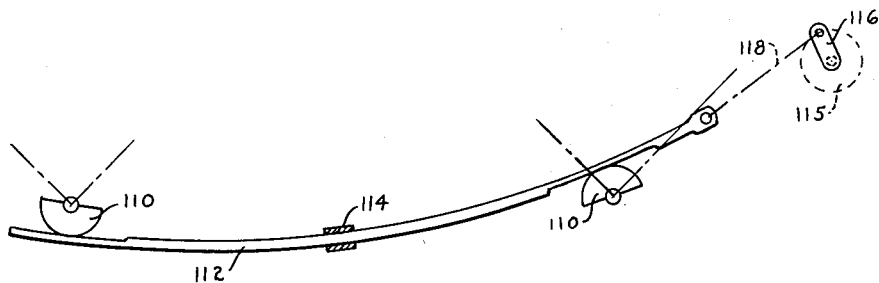
FIGURE 11 is a schematic showing of a modified form of apparatus for creating oscillatory movement of the wiper arms and blades across a windshield.

FIGURE 11 is a schematic showing of a modified form of my invention wherein a pair of pulley members 110 are oscillatably driven by the link member 112 which is supported by the bearing 114 for reciprocating motion substantially along the arcuate axis of the link 112. An appropriate power unit 115 is positioned near one end of the link 112 and has a crank 116 connected by a floating link 118 to the end of the link member 112 such that rotation of the crank 116 by the power unit 115 drives the link member 112 in a reciprocating manner such as to oscillate the pulleys 110 and the associated structures. This system has particular advantage in that the power unit can be mounted at either end of the link member away from the usual complex mass of wires and actuators found under the dashboard of a modern vehicle.

Figure 12:
FIGURE 12 is a schematic showing of a further modified form of my invention.

FIGURE 12 is a schematic showing of a further modification wherein the link member 125 extends between the two pulley members 126, 127 for operatively driving said pulleys and associated pivot shafts 129, 130. The connections between the link 125 and each pulley 126, 127 is shown as being substantially the same as that described with respect to FIGURES 6-10. A power unit 132 having an oscillatory output member is mounted in such a way that the output of the power unit, the pulley 126 and an arm-and-blade subassembly are all carried on the same common shaft 129. The shaft 129 has mounted on one end the arm-and-blade subassembly, has mounted intermediate the ends the pulley member 126, and has mounted on the other end the output of the power unit 132. Oscillation of the shaft 129 by the power unit 132 simultaneously oscillates the pulley 126 which in turn reciprocates the link 125 for oscillating the pulley 127. The power unit 132 simultaneously oscillates the arm-and-blade subassembly on the shaft 129 and, through the link 125 and pulleys 126, 127, oscillates the shaft 130 and its associated arm-and-blade subassembly.

From the foregoing, it is believed to be obvious that a power unit can be mounted on the axes of either pivot shaft or at various points along the link member and, through pulley and cable connections or crank connections, deliver reciprocatory motion to the link member for oscillating a desired number of pivot shafts.

Figure 13:
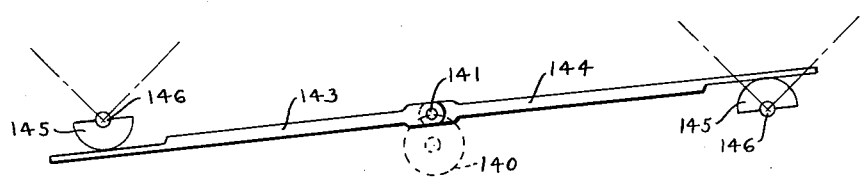
FIGURE 13 is a schematic showing of a further modified form of my invention.

FIGURE 13 shows in schematic form another type of drive connection wherein a power unit 140 having a rotary type output member has a pin 141 passing through openings in the respective overlapping ends of the links 143, 144. The outer end portions of the links are connected through a cable and pulley connection 145 as described above with respect to FIGURES 6–10 to the shafts 146 to drive said shafts and arm-and-blade subassemblies. As the pin 141 on the power unit rotates in a circular path, the links 143, 144 generally reciprocate so that the cables on the end portions drive the pulleys in an oscillatory manner whereupon the shafts and arm-and-blade subassemblies are oscillated on the surface of the windshield.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A windshield wiper drive mechanism comprising a pair of pivot shafts angularly positioned with respect to each other along the lower edge of a windshield, a pulleylike member carried by each of said pivot shafts for oscillatory motion therewith, a link member operatively connected with each of said pulleylike members along a line substantially tangent to the periphery of the pulleylike members, bearing means slidably supporting an intermediate portion of said link member, said link member being shaped so that the points of contact with the pulleylike members and with the bearing means lie in a substantially arcuate path having a center substantially at the intersection of the extensions of said pivot shafts, and power means connected with the link member for reciprocating said link member for movement about the center of the arcuate path whereby the pulleylike members are oscillated.

2. In a windshield wiper assembly and in combination: a pulleylike member having oscillatory connection with and being adapted to activate a windshield wiper arm-and-blade subassembly, a power unit, a link member operatively connected with said power unit for reciprocatory movement thereof, said link member being operatively connected with said pulleylike member to oscillate said pulleylike member, said last-mentioned connection comprising said link member having an elongate portion lying adjacent said pulleylike member, said pulleylike member having a peripheral surface substantially mating with said elongate portion of the link member, a cable member wrapped around said pulleylike member in a peripheral groove several times deeper than the diameter of said cable member, the ends of said cable member being secured to the respective ends of the elongate portion of said link member, the peripheral surface of the pulleylike member and the mating surface of the elongate portion of the link member being shaped to remain in bearing relationship when the plane of the pulleylike member is tilted with respect to the direction of movement of the link member, and resilient means carried by the link member and operative with the cable to maintain the cable under tension, said ends of the cable member being secured to the link member in such a position that a nesting force is created therebetween for seating the surface of the pulleylike member against the elongate portion of the link member.

3. A motion-transmitting mechanism adapted to transmit motion from a power source to a driven output shaft comprising in combination: a pulley having a generally semicircular peripheral surface in cross section connected with said driven output shaft, actuating means having an elongate portion generally semicylindrical in shape and adapted to receive in rolling relation the periphery of said pulley, flexible means substantially surrounding said pulley in a groove formed in the periphery thereof, the ends of said flexible means being attached near the respective ends of said elongate portion of the actuating means in close proximity to the bottom of said semicylindrical shape, and resilient means carried by the elongate portion and operative with the flexible means near one end thereof to maintain the flexible means under tension whereby said flexible means urge said peripheral surface of said pulley into nesting relation with the inner surface of said semicylindrical portion of the actuating means, said actuating means adapted for connection to a power source and adapted to have motion applied thereto for reciprocating said actuating means whereby the pulley is oscillated to drive the output shaft.

4. A motion-transmitting mechanism comprising in combination: a shaft mounted for oscillatory movement, motion-transmitting pulley means secured to and adapted to oscillate said shaft, said motion-transmitting pulley means having a peripheral portion spaced outwardly from said shaft, the outer surface of said peripheral portion having an arcuate cross section, an actuating link adapted to be reciprocally driven, a portion of said actuating link being positioned adjacent said peripheral portion and having an arcuate contacting surface whose radius of curvature is substantially that of the outer surface of said peripheral portion whereby said arcuate contacting surface and said outer surface are adapted to mate in bearing relationship for establishing a line of rolling movement therebetween, elongate flexible connecting means operatively connecting said link and said motion-transmitting means with the opposite ends of said flexible connecting means extending tangentially from the peripheral portion of the motion-transmitting pulley means in generally opposite directions, said ends being fastened to said link at spaced-apart locations on a line laterally disposed with respect to the points of tangency of the flexible means with the peripheral portion, and means for applying tension to said elongate flexible connecting means to urge into engagement the mating contacting surfaces of the portion of the actuating link adjacent the motion-transmitting pulley means and of the peripheral portion of the motion-transmitting pulley means.

References Cited in the file of this patent

UNITED STATES PATENTS

| | | |
|---|---|---|
| 1,509,699 | Atchison | Sept. 23, 1924 |
| 1,659,219 | Shaw et al. | Feb. 14, 1928 |
| 1,677,215 | Sayre | July 17, 1928 |
| 2,119,510 | Horton et al. | June 6, 1938 |
| 2,332,123 | Whitted | Oct. 19, 1943 |
| 2,660,894 | McClelland | Dec. 1, 1953 |
| 2,875,464 | Collins | Mar. 3, 1959 |
| 2,901,764 | Anderson | Sept. 1, 1959 |
| 2,947,185 | Ziegler | Aug. 2, 1960 |

FOREIGN PATENTS

| | | |
|---|---|---|
| 126,393 | Switzerland | June 1, 1928 |
| 647,006 | France | July 23, 1928 |
| 678,333 | France | Dec. 23, 1929 |
| 741,166 | Great Britain | Nov. 30, 1955 |